United States Patent [19]

Doyle et al.

[11] Patent Number: 4,710,954
[45] Date of Patent: Dec. 1, 1987

[54] TELEPHONE SET LINE SWITCH

[75] Inventors: Francis S. Doyle, Oaklandon; Randall W. France, Indianapolis, both of Ind.

[73] Assignee: American Telephone and Telegraph Company AT&T Information Systems, Holmdel, N.J.

[21] Appl. No.: 783,586

[22] Filed: Oct. 3, 1985

[51] Int. Cl.[4] .............................................. H04M 1/08
[52] U.S. Cl. ..................................... 379/427; 379/429
[58] Field of Search ............... 379/427, 424, 426, 429, 379/436, 435

[56] References Cited

U.S. PATENT DOCUMENTS

| | | | |
|---|---|---|---|
| 4,188,512 | 2/1980 | Lord | 379/427 |
| 4,268,726 | 5/1981 | Chu | 379/427 |
| 4,326,108 | 4/1982 | Barkow et al. | 379/424 |
| 4,363,941 | 12/1982 | Nelson | 200/1 R |
| 4,572,930 | 2/1986 | Kakuta et al. | 200/5 R |

Primary Examiner—Thomas W. Brown
Attorney, Agent, or Firm—Ruloff F. Kip

[57] ABSTRACT

A line switch for a telephone set comprises a lever rockably mounted in the stand for the set and having as a rear part a plunger fin received in a slot passing through the stand to a handset cradle on its top. The lever has at its front a head carrying on its underside a pair of metal leaf springs of which front portions form spring contacts disposed over corresponding electro-conductive pads on a printed wiring board mounted within the stand. The lever is biased by a torque spring to yieldably hold the upper part of the fin in the cradle. Removal and replacement of a handset from and to the cradle actuates the lever to produce engagement and disengagement, respectively, of the spring contacts with their corresponding pads. Such spring contacts and pads form, electrically speaking, a line switch adapted upon such engagement and disengagement, respectively, to produce a "short" and an "open" of terminations at the set of the tip and ring leads therefor.

17 Claims, 6 Drawing Figures

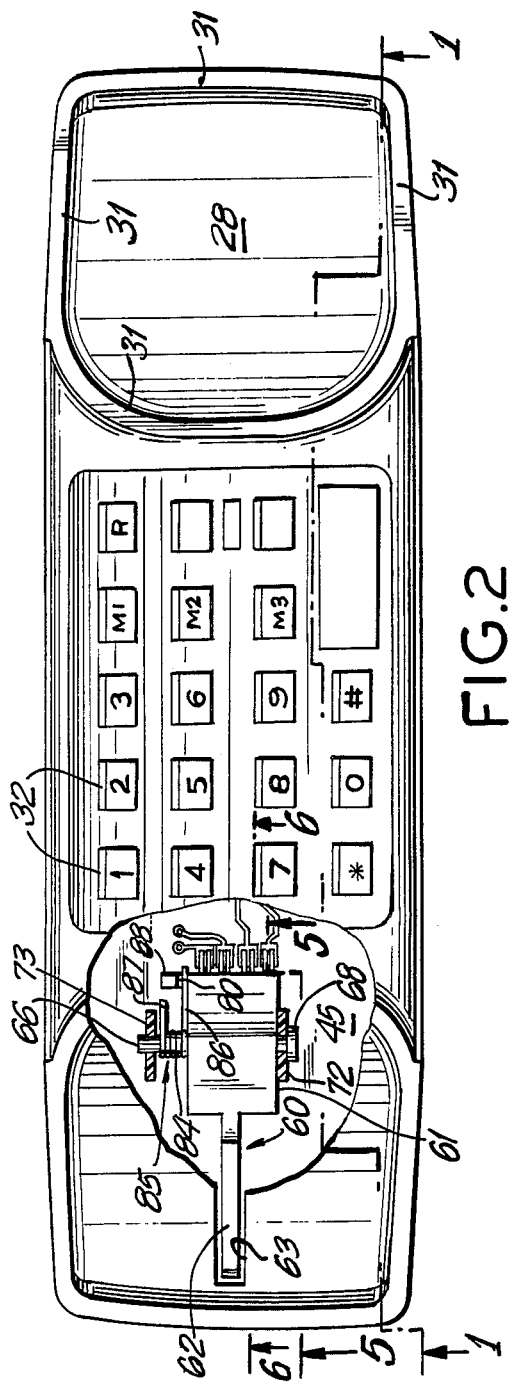
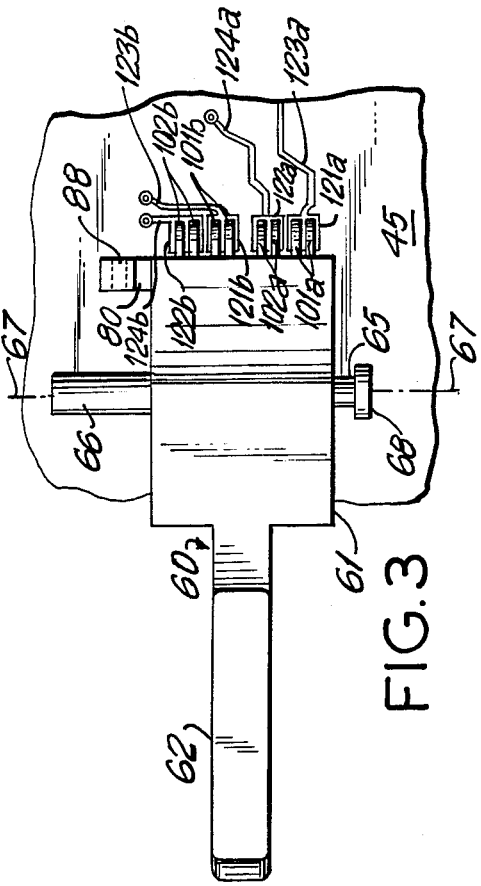

TELEPHONE SET LINE SWITCH

FIELD OF THE INVENTION

This invention relates generally to multi-pole single-throw switches and, more particularly to (a) switches of such kind useful as line or "hook" switches in telephone sets, and (b) stands of telephone sets incorporating such line or "hook" switches.

BACKGROUND OF THE INVENTION

The ordinary telephone set comprises a handset and a stand therefor having a cradle from and to which the handset is removable and returnable, at the beginning and end, respectively, of a telephone call. Included in the stand is a line switch mechanism comprising plunger means responsive to cradle removal and return of the handset to assume first and second position, respectively, a switch unit including contacts adapted by their operation to connect together and disconnect from each other the terminations at the set of the tip and ring leads which extend from the set via a telephone line to the central office serving the set, and (c) means coupling the plunger means to such unit so that movement of the former to its first and second positions actuates the unit to, respectively, produce a "short" and an "open" at such terminations of such tip and ring leads. The production of such a "short" has the effects of signaling the central office to produce dial tone at the set or to terminate ringing current thereto in the cases where, respectively, a telephone call is outgoing from end incoming to that telephone set. The production of such an "open" in either such case terminates the call.

In the usual line switch mechanism, the plunger means, switch unit and coupling means are individual components, and the switch unit in particular is independently housed and is constituted of many parts belonging exclusively to the switch unit. Such a line switch mechanism has the disadvantages of being complex in construction and of requiring undue time, effort and expense to manufacture and assemble it.

SUMMARY OF THE INVENTION

Those disadvantages are overcome according to the invention in one of its aspects by a line switch device in which the plunger means, coupling means and a mounting head for one or more of the line switch contacts are all integral parts of a unitary lever member rockably mountable within the telephone stand, and in which one or more line switch contacts carried by such head are adapted to provide a line switching action by cooperating with one or more other contacts on a printed wiring board housed in the stand primarily for purposes other than line switching. Because of such integration of the previously separate components of the line switch device into a single member, and because of partial reliance on elements outside of the line switch device itself for aid in performing the line switching function, a line switch device according to the invention is simpler in structure and lower in cost and ease of manufacture and assembly than comparable devices known to the prior art.

According to the invention in another of its aspects, line switching is accomplished by mechanism comprising an insulative contact mounting head carrying one or more metallic leaf springs each having a rear attachment to the head, and having also a blade extending from such attachment in adjacent relation with one side of the head to a forward blade portion providing one or more contacts for the line switch, that head side having an outward projection against which a central portion of the blade bears under resilient pressure. By this arrangement, the forward portion of the blade has, relative to the head, a fixed predetermined positioning and is not affected by variations in the attachment of the leaf spring to the head, so as, thereby, to contribute to the reliability of operation of the line switch.

For a better understanding of the above-described and other aspects of the invention, reference is made to the following description of a representative embodiment thereof, and to the accompanying drawings wherein:

FIG. 2 is a plan view of the FIG. 1 stand with part of the top of the stand being broken away to expose to view a printed wiring board housed in the stand and a line switch lever mounted in the stand above such board and parts associated with such lever;

FIG. 3 is an enlarged plan view of the lever and board of FIG. 2;

DETAILED DESCRIPTION OF EMBODIMENT

Figure 1:
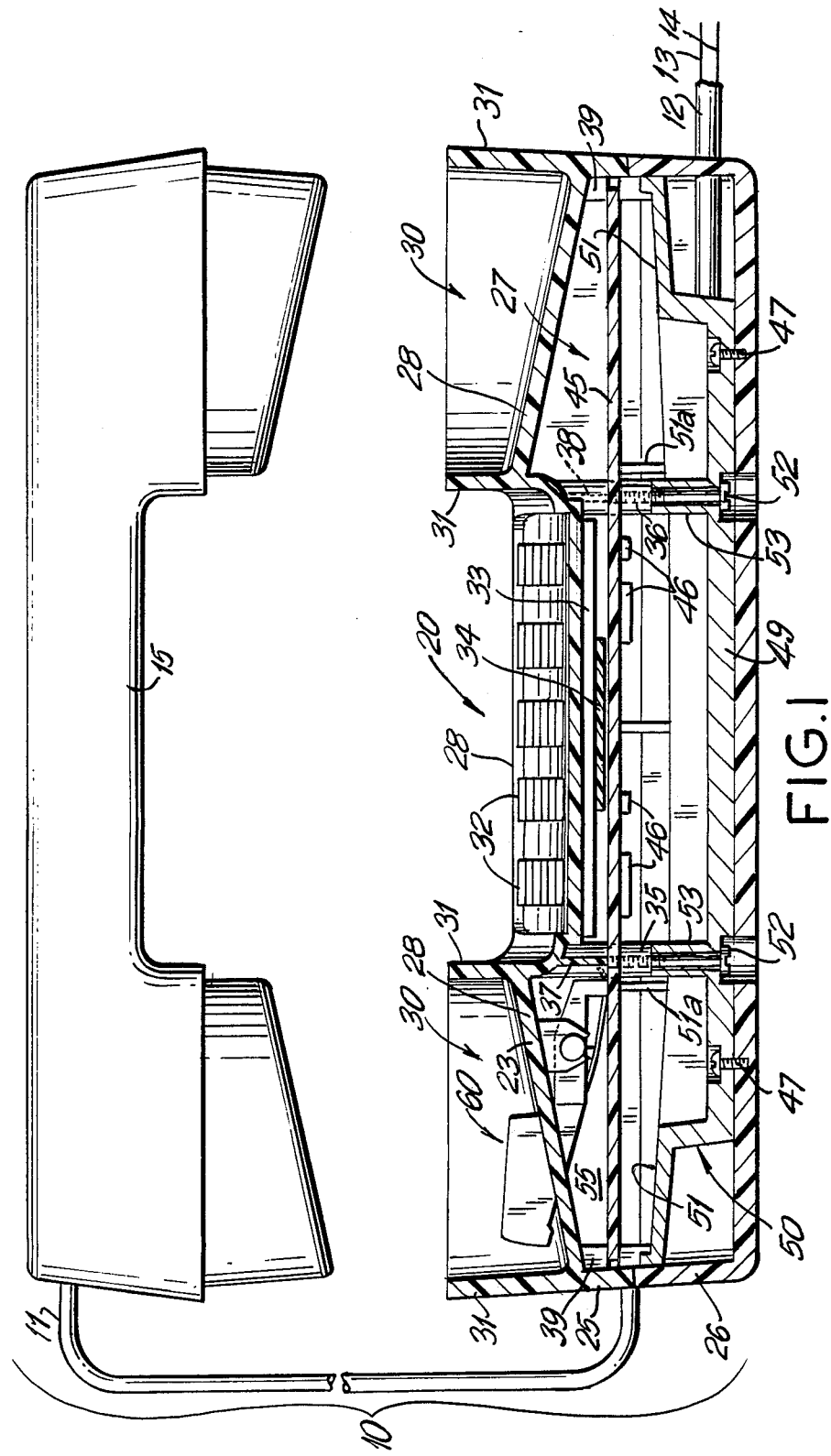
FIG. 1 is a view of front elevation of a telephone set comprising a handset and a stand therefor providing an exemplary line switch mechanism according to the invention, such stand being shown in cross-section, with the cross-sectioning being taken as generally indicated by the arrows 1—1 in FIG. 2 but departing at places from such indicated cross-sectioning for better convenience of showing.

Referring now to FIG. 1, the reference numeral 10 designates a telephone set comprising a handset 15, a stand 20 therefor, a multiconductor cord 11 connecting the handset to the stand and another multiconductor cord 12 with included tip and ring leads 13, 14 adapted to be connected by a plug (not shown) terminating cord 12 to the telephone network via a wall jack (not shown) into which such plug is inserted.

Stand 20 has an outer insulative exterior shell comprising an upper synthetic-resinous housing 25 and a mating lower synthetic-resinous casing 26, both the housing and the casing being longitudinally elongated in the plane of the FIG. 1 drawing. Housing 25 has a hollow interior 27 and an upper wall 28 integral with the rest of the housing and providing a top closure for interior 27. Opposite ends of wall 28 serve as a bottom for a cradle 30 formed in the top of housing for handset 15, and the peripheral sides of which cradle are provided by sidewall portions 31 integral with housing 25 and upstanding from its upper wall 28 to form two cup-like recesses at longitudinally opposite ends of the housing for the two ends of the handset. Between those two recesses, upper wall 28 mounts a forwardly slanting rectangular grid array of keys 32 projecting upwardly through and beyond wall 28 and forming part of a keypad for a Touch-tone(TM) telephone. The electrical circuitry for such keypad is provided on an auxiliary printed wiring board 33 mounted on the underside of wall 28 and connected by a flexible flat-cable tail 34 to other circuitry within stand 20.

Upper wall 28 has downstanding therefrom within interior 27 a pair of vertical, laterally offset spacer posts 35, 36 and a plurality of stop ribs of which ribs 37, 36 and a plurality of stop ribs of which from, respectively, posts 35 and 36, to the housing side wall nearest that part which bounds housing interior 27.

Other ribs 39 (two being shown) have free ends and extend into such interior around its periphery from the side bounding wall for such interior provided by housing 25. Posts 35, 36 pass downwardly through and beyond holes (not shown) in a main horizontal printed wiring board 45 disposed in housing 25 and extending longitudinally and laterally from side to side of the housing's interior 27. Board 45 has mounted on its underside various discrete electrical components 46 used in telephone set 10 and electrically connected via plated through holes in the board to various conductive circuit elements disposed on the upper side of the board, and some of which will be later described in more detail.

Lower casing 26 is attached by screws 47 to a metal base 50 inside the casing and providing a stabilizing weight for stand 20. Base 50 comprises a bottom dish portion 49 merging around its periphery into a surrounding raised rim portion 51 having upwardly projecting stubs 51a spaced around its top. Casing 26 and base 50 are fastened to housing 25 by screws 52 passing upward through unthreaded holes in guide posts 53, integral with dish portion 49, and then into threaded holes in spacer posts 35, 36 downstanding in housing interior 27. The turning of screws 52 in the tightening direction draws housing 25 towards base 50 and casing 26 so as, at the end of screw tightening, to produce a firm engagement between the housing and casing and to fixedly mount board 45 within housing interior 27 by clamping the board between, on the one hand, the stubs 51a upstanding from base 50, and on the other hand, the ribs 37, 38 and 39 in the housing. As so mounted, board 45 is separated from upper wall 28 of the housing by an accommodation space 55.

Disposed within space 55 is a line switch actuating lever 60 shown in FIG. 1 and in more detail in FIGS. 2–6 inclusive. Lever 60 is insulative and constituted of a synthetic-resinous material as, for example but without restriction, polycarbonate material, available from the General Electric Company, Pittsfield, Massachusetts under the tradename ML-1708 LEXAN®. Lever 60 includes as integral parts thereof a front, laterally broad contact mounting head 61 and a rear laterally narrow plunger fin 62 received in a slot 63 formed in upper housing wall 28 so that the upper part of the fin normally projects up beyond wall 28 into cradle 30 but can be displaced downward so it is no longer in the cradle.

Lever 60 is rockably mounted within housing 25 in a manner as follows. Lever 60 has on laterally opposite sides thereof a pair of laterally extending circular cylindrical pivot pins 65, 66 projecting outwards from the lever in coaxial relation with a lateral pivot axis 67 for the layer. While pins 65, 66 may be respective parts of a single stub shaft passing through the lever or, alternatively, they may be constituted of two stub shafts fitted into respective holes on opposite sides of the lever, preferably the pins are, as shown, integral parts of lever 60. The pins 65 and 66 are short and long relative to each other, and pin 65 has at its free end a stud 68 integral with and of larger diameter than the pin.

The pins 65, 66 rockably mount lever 60 within housing 25 by being rotatably received in circular cylinderical bearing holes 70, 71 formed in (FIGS. 5 and 6) two lug plates 72 and 73 respective to pins 65 and 66 and downstanding in the interior 27 of housing 25 from its upper wall 28. Holes 70 and 71 are, over a bottom arc of less than 180 degrees of their circumference, merged with insert openings 74 and 75 which extend to the bottoms of lug plates 72 and 73 and which are downwardly divergently tapered to permit pins 65 and 66 to be snap-fitted into holes 70, 71 by forcing them upward through such openings into such holes. Once snap fitted into these holes, the pins 65, 66 remain therein unless forcibly removed therefrom.

Lug plate 72 which supports pin 65 is of such lateral thickness that (FIG. 2) it fits only with clearance between the stud 68 on the pin and the side towards that stud of lever 60. Accordingly lever 60 cannot laterally shift in either direction by more than that clearance relative to the lug plate and, in that way, the pins 65, 66 are prevented from laterally slipping out of bearing holes 70, 71. On the other hand, lug plate 73 is spaced away from the side nearest thereto of lever 60 by a distance great enough to permit a substantial length of pin 66 to extend from plate 73 to lever 60. Encircling that pin length is the helix part 84 of a torque spring 85 of resilient wire comprised of such helix 84 of wire and of two more or less straight lengths 86 and 87 of such wire extending from opposite ends of helix 84. The outward free end of wire length 86 is seated in an upward facing notch 80 in a catch 88 integral with lever 60 and formed on the same side thereof as is pin 56. The outward free end of wire length 87 is seated (FIG. 5) in a notch 83 formed in a stop nub 89 downstanding from wall 28 near lug plate 73 so that such free end bears against an interior portion of housing 25 to be restrained by such portion from rotating further counterclockwise relative to the axis of helix 84. The seating of wire lengths 85 and 87 in notches 80, 83 inhibits lateral shifting of helix 84 in the length of pin 66, and moreover, has the tendency to keep lug plate 72 centered between stud 68 and lever 60 so that such lug plate will not frictionally contact either. With wire length 87 being so restrained and wire length 86 bearing against catch 88, helix 84 is wound to generate a torsion force urging catch 88 downward to impart to lever 60 a moment urging it to rotate clockwise about its pivot axis 67. Thus the effect of torque spring 85 as to bias lever 60 is to maintain plunger fin 62 in its "up" position at which the upper part of the fin is in cradle 30.

From the foregoing it is evident that pin 66 performs the dual functions of providing part of the mounting for lever 60 and of supporting the torque spring 85 for biasing that lever.

Coming now to the front part of lever 60 which provides the contact mounting head 61, that head carries on its underside a pair of metallic leaf springs 90a, 90b (FIG. 4) which are duplicates of each other and which are constituted, for example without restriction, or resilient phosphor bronze material. Focusing on spring 90a, it comprises (FIG. 6) a blade 91a and a rear tab 92a joined by a bend in spring 90a to blade 91a so that tab 92a is at an angle to and offset from the blade to extend upwardly therefrom. Tab 92a is press fitted into a retaining channel 93a extending at the rear of head 61 from its bottom into the body of the head. The press fitting of tab 92a into that channel forms for spring 90a an attachment thereof to head 61 so that the blade 91a is supported by such head as a cantilever extending forward from such attachment beneath the bottom of head 61 to a free end 94a which is longitudinally outward of the front of head 61 and is upwardly bowed relative to the length of blade between end 94a and the blade attachment.

Figure 4:
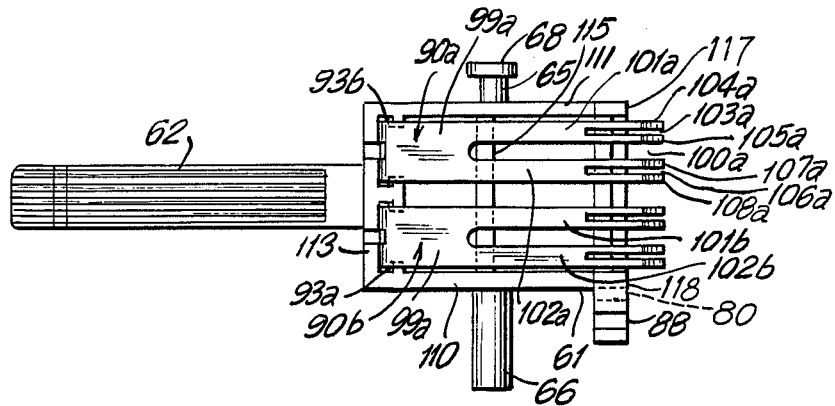
FIG. 4 is a bottom view of the FIG. 3 lever.

As shown in FIG. 4, leaf spring 90a is a furcated metallic member having a major furcation 100a dividing the front of blade 91a into two laterally spaced major tines 101a and 102a which, electrically speaking, constitute two line switch metallic contacts electrically shorted together by the portion 99a of the blade behind those contact tines. Contact tine 101a has a minor furcation 103a therein dividing it at its front into two laterally spaced minor tines 104a, 105a. Contact tine 102a is similarly divided by a minor furcation 106a at its front into two laterally spaced minor tines 107a, 108a.

Head 61 comprises an upper web 109, two laterally spaced longitudinally extending side walls 110, 111 downstanding from web 109, front and rear braces 112, 113 downstanding from web 109 and laterally extending between such side walls, and a bridge 115 downstanding from web 109 and laterally extending between sidewalls 110, 111 longitudinally intermediate braces 112 and 113. Front brace 112 forms for head 61 a nose having flats 117, 118 on its downside. Bridge 115 extends downward beyond the bottom of sidewalls 110, 111 to form a downward projection from the bottom of head 61. Before leaf spring 90a is attached to that head by press fitting of the leaf spring's tab 92a into retaining channel 93a in the head, the angle initially subtended on the upper side of the leaf spring between its tab 92a and blade 91a is somewhat smaller than after such press fitting. Accordingly, the blade 91a in the course of such press fitting is, when it comes into contact with bridge 115, resiliently deflected by that contact so as to thereafter bear against bridge 115 with pressure generated by such resilient deflection. Such will occur irrespective of variations in the initial amount of angular bend between tab 92a and blade 91a, the only difference caused by such variations being in the amount of resilient pressure exerted by blade 92a on bridge 115. Accordingly bridge 115 and the resilient pressure contact thereof by blade 92a serves to maintain the contact portions 101a, 102a of the blade spaced away from the bottom of head 61 in a fixed predetermined positioning relative to head 61, which positioning is independent of manufacturing variations in the bend angle between the tab and blade portions of leaf spring 90a.

The foregoing description relating to leaf spring 90a applies mutatis mutandis to leaf spring 90b.

Referring now to FIGS. 2 and 3, contacts 101a and 102a carried by head 61 are disposed above two corresponding printed electroconductive pads 121a and 122a formed on the top surface of main printed wiring board 45, and contacts 101b, 102b carried by that head are similarly disposed above two corresponding printed electroconductive pads 121b, 122b on board 45. Pads 121a and 122a are ohmically coupled through printed circuit paths 123a, 124a on board 45 and other electrical circuitry (not shown) in stand 20 to respectively, the tip lead 13 and internal electronics (not shown) for telephone set 10. Similarly pads 121b, 122b are ohmically coupled through printed circuit paths 123b, 124b and such other circuitry to respectively, the ring lead 14 and such internal electronics for such set. It will be appreciated that besides the described elements 121-124, board 45 has on its top many other printed electric circuit elements and paths (not shown) coupled with each other and through plated through holes to the discrete circuit components 46 on the underside of the board.

USE OF THE EMBODIMENT

Figure 5:
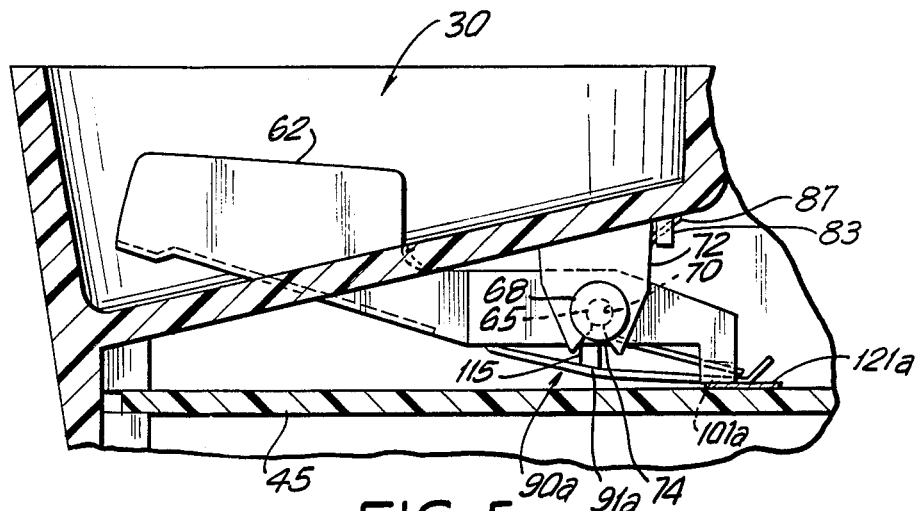
FIG. 5 is a front elevation in cross-section, taken as indicated by the arrows 5—5 in FIG. 2, of a part of the FIG. 2 stand including the line switch mechanism therein.

Referring now to FIGS. 1, 2, 5 and 6 and considering FIG. 5 particularly, upon the removal of handset 15 from cradle 30, the bias imparted to actuating lever 60 from torque spring 85 causes that lever to rock clockwise about its pivot axis 67 to elevate the upper part of plunger fin 62 above the bottom of cradle 30 until the fin arrives at its full "up" position which is reached when further fin upward movement is stopped by the coming into contact with the printed wiring board 45 of the flats 117, 118 on the nose of head 61. The upward movement of fin 62 is accompanied by a concurrent downward movement of the front of head 61 and of the resilient contacts 101a, 102a, 101b, 102b carried by that head so that such contacts first engage pads 121a, 122a, 121b, 122b, respectively, and, then with further downward movement of the front of head 61 to its full "down" position, are resiliently deflected by such engagement to bear firmly against their corresponding pads with the pressure generated by such deflection and to exert on lever 60 a counterclockwise torque force opposing the torque force thereon from spring 85. That resilient deflection of the portions of those contacts beneath head 61 is made possible by the fact that such portions are held spaced away from the bottom of the head by the cantilever support of the leaf spring blades by the head. Such firm resilient pressure engagement between the mentioned contacts and their corresponding pads is desirable because it assures long time reliable uniform electrical contact between such spring contacts and such pads. Because bridge 115 holds such spring contacts in fixed predetermined positions relative to head 61, such uniform pressure electrical contacts will be made despite manufacturing variation in the angle of bend between the tabs and the blades of the leaf springs. Moreover, the downward angular movement of lever 60 causes the spring contacts to undergo a wiping action relative to the contact pads, and that wiping action tends to maintain clean both the contact pads and the areas engaging them of the spring contacts.

In connection with such engagment of the spring contacts carried by head 61 with their corresponding pads on board 45, the following is noted.

The resilient pressure of engagement of these elements is required by design considerations to be no less than a certain value P in order to assure long time reliable electrical contact between those elements. The pressure P is roughly equal to $kDS_1$ where k is a constant, D is the resilient deflection in the vertical direction induced in the spring contacts by their engagement with their corresponding pads and $S_1$ is the stiffness of the length $L_1$ of the leaf springs from bridge 115 to their points of contact with the pads. To conserve on the vertical dimension needed within accomondation space 55 to provide for the rocking movement of lever 60, it is desirable that distance D be reduced to its minimum practical value determined by design consideration inolving manufacturing cariations in the dimensions and positioning of the components of stand 20, and such reduction can be effected by designing length $L_1$ to have a stiffness $S_1$ which is greater than smaller.

The selection of a higher stiffness $S_1$ for length $L_1$ of the leaf springs within a range of stiffness available for that length has, however, an effect on the length LYhd 2 of such springs from bridge 115 back to the attachment of those leaf springs to head 61. Specifically, the selected stiffness $S_1$ for length $L_1$ is a determinant of what the stiffness $S_1$ of the leaf springs will be for length $L_2$, the stiffness $S_2$ varying directly with the stiffness $S_1$. For however, a determined stiffness $S_2$, the length $L_2$ must be great enough to assure that, when the initial bend angle between a tab 92 and a blade 91 of a leaf spring is abnormally small, the press fitting of such tab into head 61 will not cause bridge 115 to deflect the blade beyond its resilient limit so that he blade over its length $L_2$ takes on a permanent "set". To put it another way, as the stiffnesses $S_1$ and $S_2$ increase, the length $L_2$ must also increase to avoid deformation beyond their elastic limit of the leaf springs over length $L_2$.

The solution afforded by the described embodiment to utilizing relatively high stiffnesses $S_1$ and $S_2$ within a range available therefor (in order thereby to reduce the distance D to minimum practical value) while concurrently avoiding permanent deformation of the leaf springs over length $L_2$ is to provide leaf springs or equivalent resilient members of which the overall longitudinal lengths are relatively large as compared to the entire longitudinal length of the line switch actuating lever. Thus, for example, in the described embodiment, the overall length of leaf springs 90a, 90b is more than half the longitudinal extent of the plunger fin 62 and close to half the longitudinal extend of the lever 60.

With, however, the leaf springs being of such relatively great overall length, the desired minimum practical distance D would be greatly exceeded if the pivot axis for the actuating lever were to have the same location in the longitudinal dimension as the attachment of the leaf springs to their mounting head so that the leaf spring over the full length move downward when plunger fin 62 moves upward. This problem is avoided in the described embodiment by having the pivot axis 67 for lever 60 positioned longitudinally forward of the attachments of leaf springs 90a, 90b to head 61 so as to have a mediate location in the overall length of such springs. That mediate location of the pivot axis produces the interesting effect that, when lever 60 is rocked clockwise about axis 67 by elevation of its plunger fin 62 (FIG. 5) in response to removal of handset 15 from cradle 30, the rear portions of the leaf springs actually move upward with the fin, and such upward movement of the leaf springs is the contrary of the downward movement needed at that time to produce closure between the leaf springs and their corresponding pads on board 45. However, concurrently with that upward movement of the rear portions of the leaf springs, the forward contact portions 101, 102 thereof move downward to effect such closure. This being so, it will be appreciated that the mediate longitudinal location of pivot axis 67 in the overall length of the leaf springs permits such springs both to have relatively large overall lengths (which is advantageous for the reasons previously described) and to not be deflected by engagement with the pads by more than the minimum practical distance D needed to produce the desired engagement pressure P when, as is desirable (for reasons above described), the springs are of relatively high stiffness. In such connection, it is to be noted that, since pivot axis 67 has a location in the longitudinal dimension about half way between the attachment of the leaf springs at their rear to head 61 and the front ends of these leaf springs, the up-down movements of the front and rear portions of the leaf springs are about the same so that substantially no more vertical room is required in space 55 to accommodate the movement of the rear portions of those springs than is required to accommodate the movement of the front portions thereof.

Figure 6:
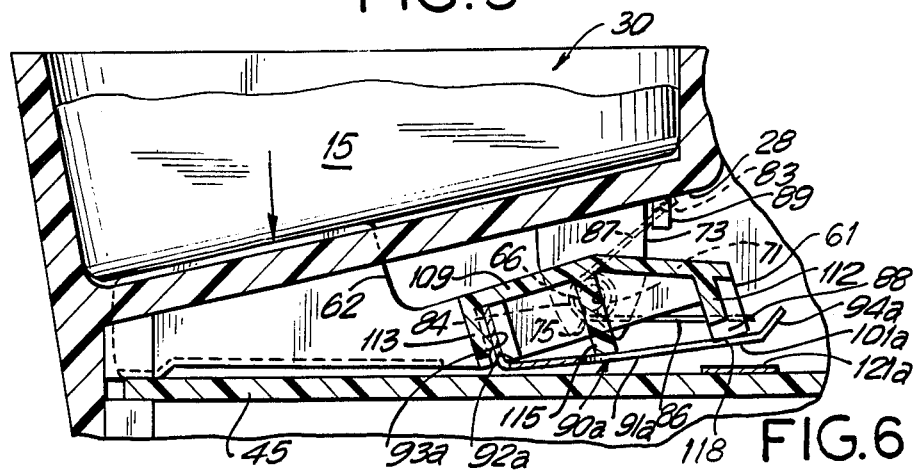
FIG. 6 is a front elevation in cross-section, taken as indicated by the arrows 6—6 in FIG. 2, of the part of the stand also shown in FIG. 5.

Proceeding now to FIG. 6, when the handset 15 is replaced in cradle 30 so that the weight of the handset drives plunger fin 62 to its full "down" position at which its upper part is displaced out of cradle 30, the downward driving of the fin causes lever 60 to rock counterclockwise about its pivot axis 67 to move the front of head 61 to its full "up" position. In the course of such upward movement of the front of head 61 the spring contacts 101a, 102a, 101b, 102b carried by the head disengage from their corresponding pads 121a, 122a, 121b, 122b on board 45 to assume the positions for their contacts shown in FIG. 6 when the front of head 61 is fully "up".

Considering now the electrical effect of the engagement and disengagement of the mentioned spring contacts with their corresponding pads, since pads 121a and 122a are ohmically coupled to, respectively, tip lead 13 and the internal electronic of set 10 and spring contacts 101a and 102a of leaf spring 90a are ohmically coupled to each other through back portion 99a of that leaf spring, the engagement of contacts 101a and 102a with, respectively, pads 121a and 122a will short the tip lead 13 and to such internal electronics to thereby signal the central office that such sorting has occured.

In a similar manner the engagement and disengagement of the spring contacts 101b and 102b of leaf spring 90b with pads 121b and 122b will "short" ring lead 14 to the mentioned internal electronics and signal to the central office that such shorting has occurred. The "short" signal transmitted over leads 13 and 14 to the central office there operates to cause that office to produce dial tone at set 10 or terminate ringing current thereto in dependence on whether a telephone call is being initiated or received at that set. It follows that the disengagement of such spring contacts with such pads will produce over leads 13 and 14 an "open" signaling that a telephone call conducted at that set has been terminated.

It will be evident, therefore, that the mentioned spring contacts and pads serve in set 10 as contacts of a line or hook switch therefor. Because, however, ones of the contacts of such switch (i.e., the contacts constituted of pads 121a, 122a, 121b, 122b) are provided by a set component (i.e., board 45) already included in the set primarily for purposes other than effecting line switching, the actuating mechanism for such switch may be simple in construction as described above and the cost of such switch and the time and effect involved in its manufacture and assembly may all be significantly reduced.

The above described embodiment being exemplary only, it is to be understood that additions thereto, omissions therefrom and modifications thereof may be made without departing from the spirit of the invention, and that accordingly the invention is not to be considered as limited save as is consonant with the scope of the following claims.

What is claimed is:

1. A telephone line switch device comprising: a generally horizontall unitary synthetic-resinous switch actuating lever extending longitudinally front-to-rear and having at its front and rear, respectively, as integral parts thereof, (a) a laterally broad contact mounting head and (b) a laterally narrow upwardly-projecting plunger fin, pivot means for mounting said lever to be rockable about a lateral pivot axis therefor located in the length of said lever between its front end and its longitudinal center so that such lever is adapted by rocking to move said head at its front to up and down positions responsive to movement of said fin to respectively, a down and an up position, and a plurality of downward-facing laterally spaced metallic contacts carried by said head to be on the underside thereof and adapted responsive to movement of the front of said head to respectively, its up position and down position to open and close, respectively, with corresponding fixed conductive elements underlying said head.

2. A device according to claim 1 in which said pivot means comprises first and second laterally extending pivot pins which are integral parts of said lever, and which are coaxial with said pivot axis and project outward from laterally opposite sides of said lever.

3. A device according to claim 2 further comprising a stud integral with, and on the outer end of, and of larger cross-section than, said first pivot pin.

4. A device according to claim 2 further comprising; a catch integral with said head and on the same lateral side thereof as said second pivot pin, and a torque spring comprising a helix of resilient wire encircling said second pin, a length of such wire extending from one end of said helix and adapted to have the free end of such length bear against said catch, and another length of such wire extending outward from the other end of said helix and adapted to have the free end of such other length bear against fixed stop means therefor.

5. A device according to claim 1 in which said contacts are provided by tines of a flat metallic member which is furcated between such tines and which is adapted to ohmically connect said conductive elements through said member upon closure of said contacts with said elements.

6. A device according to claim 1 in which said contacts are provided as forward portions of at least one metallic leaf spring having an attachment at its rear to said head at its rear and having a longitudinally elongated part in the form of a blade supported by said head as a cantilever extending beneath the bottom of said head longitudinally forward from such attachment, and in which said head's bottom has formed thereon a downward projection contacting said cantilever-supported blade at a mediate location in its length and under pressure generated by resilience characterizing said blade, said projection and the pressure contact therewith of said blade maintaining the uncontacted part of said blade spaced away from the bottom of said head in a predetermined fixed positioning relative thereto.

7. A device according to claim 6 in which said leaf spring has at its rear a tab connected to and angularly offset from said blade by a bend in said spring, and in which said attachment of said spring to said head is effected by a press fitting of said tab into a retaining channel therefor formed in said head.

8. A device according to claim 6 in which said pivot means for mounting said lever is logitudinally disposed at a mediate location in the length of said blade so that rocking of said lever about said pivot axis therefor produces up and down movements in opposite directions of, respectively, the front and the rear of said blade.

9. A device according to claim 6 in which said blade has an overall length close to half of the longitudinal extent of said lever.

10. A stand for the handset of a telephone set, said stand comprising: a longitudinally extending insulative housing having a hollow interior and an outer wall providing both a closure for said interior and a cradle formed in said housing for said handset, a printed wiring board mounted by said housing in said interior inward of said wall to be separated therefrom by an accommodation space, said board having a plurality of laterally spaced conductive pads disposed thereon, a contact mounting head disposed in said space outward of said pads and mounted in said housing to be movable at its front between first and second positions relative to said pads, plunge, means responsive to removal and return of said handset from and to, respectively, said cradle to move said head to, respectively, said first position and said second position, therefore, and a plurality of laterally-spaced metallic contacts carried by said head to be on the side thereof towards said board and each adapted to close and open, respectively, with a corresponding one of said pads when said head is moved to, respectively, said first position and said second position therefor.

11. A stand according to claim 10 in which said contacts are provided by forward portions of at least one metallic leaf spring having an attachment at its rear with said head at its rear and having a longitudinally elongated part in the form of a blade supported by said head as a cantilever extending adjacent said side of said head longitudinally forward from said attachment, and in which said head has formed thereon a projection contacting said cantilever-supported blade at a mediate location in its length and under pressure generated by resilience characterizing said blade, said projection and the pressure contact therewith of said blade maintaining the uncontacted portion of said blade spaced away from said head in a predetermined fixed positioning relative thereto.

12. A stand according to claim 10 in which said head is an integral front part of a generally horizontal unitary synthetic-resinous switch actuating lever disposed in said accommodation space and extending longitudinally front to rear, said stand includes pivot means for mounting said lever so that it is rockable in said housing about a lateral pivot axis longitudinally located intermediate the front and rear of said lever, and in which said plunger means is an integral rear part of said lever and is in the form of a fin laterally narrower than said head and projecting upwardly to be received in a through slot formed in said housing's upper wall, said fin being movable by rocking of said lever about said axis between up and down positions at which, respectively, said fin projects up into and is downwardly displaced from said cradle, and said head being concurrently moveable at its front between said first position therefor and said second position therefor.

13. A stand according to claim 12 further comprising spring means for biasing said lever to urge said fin to said up position therefor.

14. A stand according to claim 12 in which said pivot means comprises: first and second laterally extending pivot pins which are integral parts of said lever and are coaxial with said pivot axis and project outward from laterally opposite sides of said lever, first and second pin supports fixedly disposed in said housing on laterally opposite sides of said lever and having lateral passages therein in which said pins are received so that said first and second pins are journaled in respectively, said first and second supports with said first pin extending laterally through and beyond the passage therefor in said first support so that the outer end of such pin is outward of such support, and a stud integral with and on the outer end of said first pin and of greater cross-sectional size than said passage in said first support, said stud by contact thereof with such support being adapted to limit lateral shifting of said lever.

15. A stand according to claim 14 further comprising: a catch integral with said head and on the same lateral side thereof as said second pin, and a wire torque spring comprising a helix of resilient wire encircling said second pin between said lever and second support, a length of such wire extending from one end of such wire to said catch so that the free end of such length bears with resilient pressure against said catch, and another length of such wire extending from the other end of such helix to an interior portion of said housing so that the free end of such other length bears with resilient pressure against such portion.

16. A device according to claim 6 in which said blade has an overall length close to half the longitudinal extent of said lever, and in which said pivot means for mounting said lever is disposed at a mediate location in the length of said blade so that rocking of said lever about said pivot axis therefor produces up and down movements in opposite directions of, respectively, the front and the rear of said blade.

17. A device according to claim 16 in which said pivot means is disposed in the longitudinal dimension about half way between the front and the rear of said blade.

* * * * *